United States Patent [19]
Beistle et al.

[11] Patent Number: 5,473,752
[45] Date of Patent: Dec. 5, 1995

[54] FAULT ISOLATION CIRCUIT

[75] Inventors: Edward G. Beistle, Appleton, Wis.;
Martin J. Seabolt, Apple Valley, Minn.

[73] Assignee: Detector Electronics Corporation, Minneapolis, Minn.

[21] Appl. No.: 376,068

[22] Filed: Jan. 20, 1995

Related U.S. Application Data

[63] Continuation of Ser. No. 32,360, Mar. 17, 1993, abandoned.

[51] Int. Cl.⁶ .................................................. G06F 11/00
[52] U.S. Cl. ................................ 395/182.02; 395/183.19
[58] Field of Search .................................. 371/11.1, 11.2, 371/20.1, 20.2, 20.6; 395/182.02, 183.19

[56] References Cited

U.S. PATENT DOCUMENTS

| | | | |
|---|---|---|---|
| 3,652,798 | 5/1972 | McNeilly et al. | 371/11.2 |
| 3,716,834 | 2/1973 | Adams | 340/147 |
| 4,939,730 | 7/1990 | Traver | 371/11.2 |
| 5,105,426 | 4/1992 | Hagiwasa | 371/20.1 |
| 5,132,962 | 7/1992 | Hobgood et al. | 370/16.1 |
| 5,140,625 | 8/1992 | Reum et al. | 395/5 |
| 5,278,977 | 1/1994 | Spencer et al. | 395/575 |

Primary Examiner—Robert W. Beausoliel, Jr.
Assistant Examiner—Norman M. Wright
Attorney, Agent, or Firm—Palmatier, Sjoquist & Helget

[57] ABSTRACT

A system for detecting and isolating faults in a two-wire communications loop which includes a number of node circuits dispersed along the loop. Each node circuit executes a fault detection algorithm and selectively switches its connections to adjacent node circuits to effectively isolate itself from the fault condition. When all node circuits have completed their respective fault detection algorithms the fault condition is disconnected from the two-wire communications loop.

5 Claims, 4 Drawing Sheets

5,473,752

FAULT ISOLATION CIRCUIT

This is a continuation of U.S. application Ser. No. 08/032,360, filed Mar. 17, 1993, now abandoned.

BACKGROUND OF THE INVENTION

The present invention relates to communications systems; more particularly, the invention relates to circuits for fault isolation on a communications system wherein system interconnections are made by way of a single twisted pair wiring loop. Such communications systems are well known in the prior art, wherein a plurality of communications nodes are dispersed along a twisted pair signal loop, the ends of the wiring loop being connected to a computer processor or like device. Unless particular precautions are made, an open circuit or short circuit at any point along the loop will usually cause a communications failure between the processor and all systems connected to nodes along the loop.

Different fault isolation and/or correction techniques are typically utilized in situations wherein the fault is caused by an open circuit versus situations wherein the fault is caused by a short circuit along the communications loop. Whereas there are a number of prior art techniques for fault isolation wherein the fault is caused by an open loop, it is more difficult to maintain communications line integrity and fault isolation in situations where communications loops are short circuited at some point along the loop.

SUMMARY OF THE INVENTION

The present invention is adaptable for a twisted pair communications loop wherein a plurality of nodes are dispersed along the communications loop, and wherein each node has an intelligence capability associated therewith; i.e., each node has a computer processor primarily directed to the monitoring and/or control of a device located at the node position. Each node processor is adapted to execute a fault isolation sequence by activating switches within the node whenever a fault condition is detected. The central processor is adapted to periodically transmit particular coded information which is received at all nodes along the loop, and the fault isolation sequence of the respective nodes is executed whenever the periodically-transmitted code is not detected at a particular node. The switching sequence at each node comprises the steps of disconnecting the node first from the communications loop and all devices connected to it on one side of the node, then disconnecting the communications loop and all devices connected to it on the other side of the node, and determining whether either of these changes cause the fault condition to go away. If the fault condition is removed through these changes the node retains the switching conditions which remove the fault condition, and continues to communicate with the central processor via the portion of the communications loop to which it remains connected. The node switching sequence also includes a further step of disconnecting the node from a communications loop and all devices connected to it on both sides of the node, and effectively isolating the node itself from the communications loop.

It is therefore a principal object of the present invention to provide a fault isolation circuit inherently operable within each of the plurality of nodes in a communications loop.

It is another object of the present invention to provide a communications fault isolation circuit wherein communications integrity may be maintained while removing the fault condition.

It is another object of the present invention to provide a fault isolation intelligence at each node in a communications loop, wherein the circuits within the node may themselves isolate the fault.

It is a further object of the present invention to provide a fault isolation technique wherein a communications loop may be severed at the point of a short circuit, while permitting the devices connected along the loop to independently communicate with a central processor through the remaining communications links.

It is a principal feature and advantage of the present invention to provide a system capable of operating on a twisted pair communications loop wherein each of a plurality of nodes is capable of independently isolating and correcting a fault condition.

It is another feature and advantage of the present invention to provide a communications system connected by a twisted pair loop wherein the system may continue to function even though the communication loop is disabled because of a fault condition.

The foregoing and other features and advantages of the invention will become apparent from the following specification and claims, and with reference to the appended drawings.

DESCRIPTION OF THE PREFERRED EMBODIMENT

Figure 1:
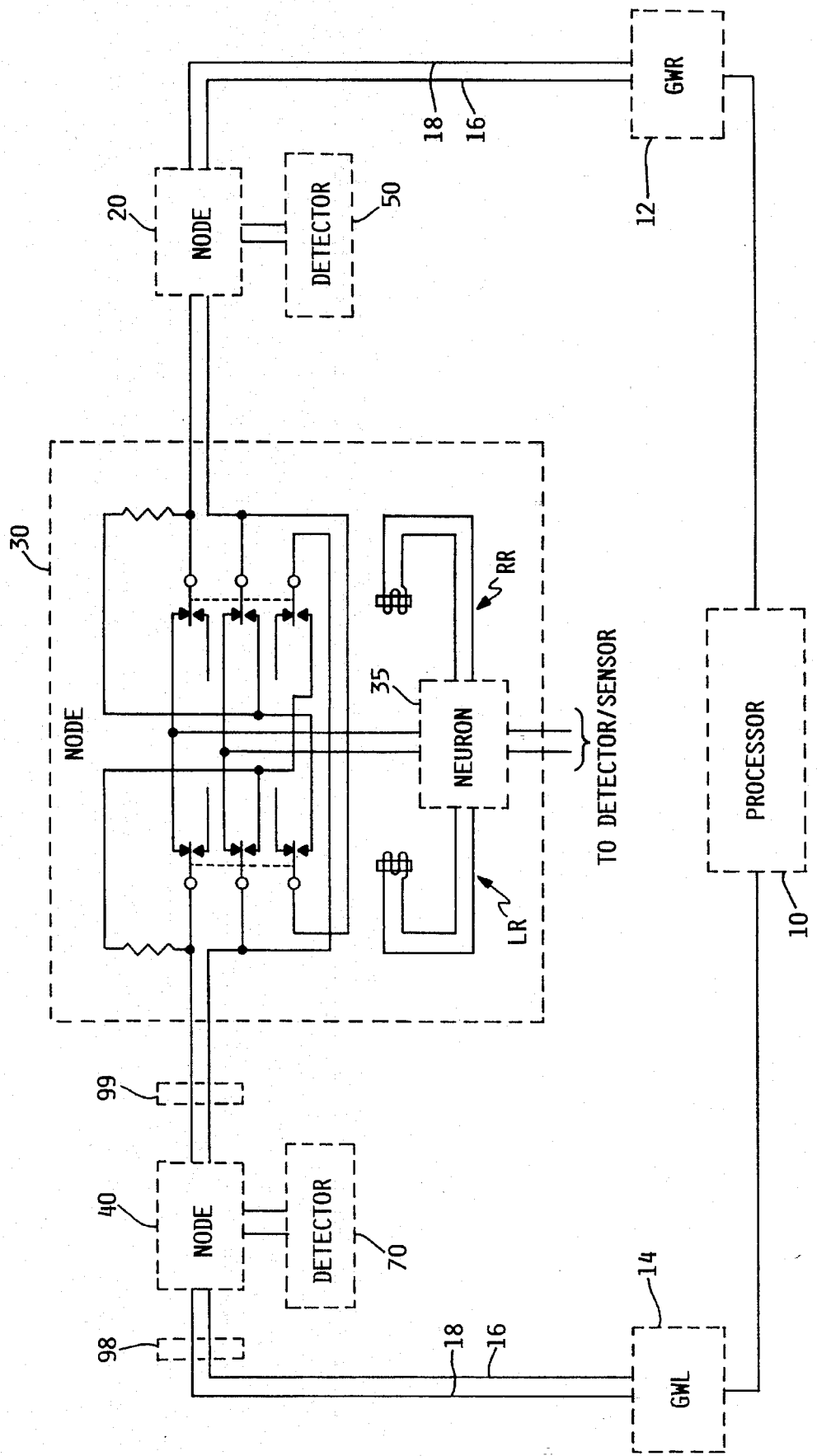
FIG. 1 shows a block diagram of the invention interconnected in a twisted pair communications loop.

Referring first to FIG. 1, there is shown a block diagram of a twisted pair communications loop wherein the respective ends of the communications loop are connected to a central processor 10 via communications gateway circuits 12 and 14. The communications gateway circuits 12 and 14 are typically connected to communication ports on processor 10, and each communications gateway circuit is respectively connected to one end of the twisted pair communications loop. Alternatively, the communications gateway circuits may be connected to a programmable logic controller or a distributed control system, depending upon the particular communications systems requirements. The function of the communications gateway circuits is to translate the protocol of the central processor (or equivalent) to the proprietary protocol of the plurality of devices connected to the respective nodes dispersed about the communications loop. This translation is typically accomplished in both directions; i.e., the proprietary protocol of the devices attached to the communications loop may be translated to the protocol of the central processor 10, and the protocol of the central processor 10 may be translated to the proprietary protocol of the devices. For convenience herein, communications gateway circuit 12 will be referred to as "gateway right" (GWR), and gateway communications circuit 14 will be referred to as "gateway left" (GWL). Under normal operating conditions communications between the central processor 10 and the nodes on the communications loop are transmitted by both GWR 12 and GWR 14, and received by both GWR and GWL; under the fault conditions described herein the central processor 10 continues to communicate with the node circuits on the communications loop through both GWR and GWL independently.

The twisted pair communications line is referred to herein as 16, 18, and a typical communications loop is shown in FIG. 1 in simplified form for clarity. In the preferred embodiment associated with this invention the communications loop may be up to 2,000 meters in length, and may communicate with 60 different nodes dispersed along the loop. The preferred system may be further expanded by the addition of further expansion circuits which are beyond the scope of the present invention. The preferred embodiment of the present invention utilizes the communications loop to connect a plurality of gas detectors to the respective nodes along the loop, although the principles described herein are applicable to a wide variety of nodes and interconnected devices.

The twisted pair communications loop passes through a plurality of node circuits, of which three such node circuits are shown in FIG. 1, as node circuits 20, 30 and 40. Node circuit 30 is shown in expanded outline form, and is representative of the circuits within each of the other node circuits on the system. The detailed description which follows herein is directed to the circuits of node circuit 30, but is equally applicable to the remaining node circuits. Each of the node circuits is respectively connected to an input device, such as detector/sensor 50 which is connected to node 20 and detector/sensor device 70 which is connected to node 40.

Figure 2A:
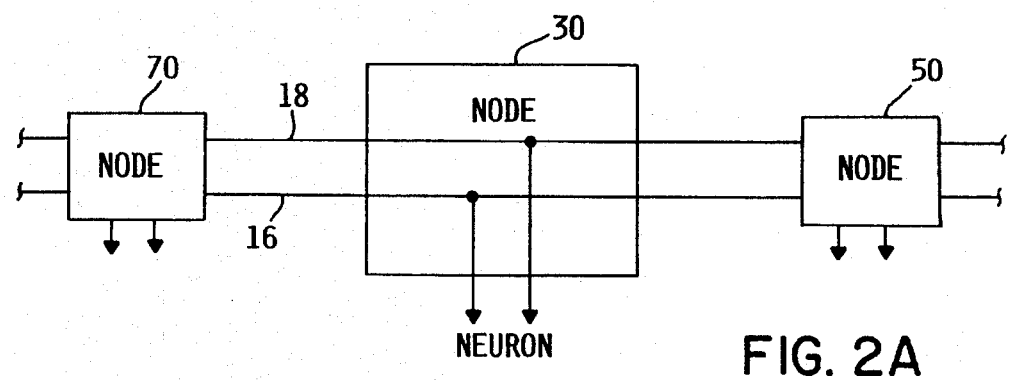
FIGS. 2A–2D show each of the four switching states of the fault isolation circuit.

Node circuit 30, and all other node circuits, has an intelligence circuit network associated therewith. In node circuit 30 this intelligence network is referred to as a neuron 35. Neuron 35 is connected to a detector/sensor, and includes one or more computer processors as a part of its operable logic. Neuron 35 may issue command/control signals to the detector/sensor to which it is connected, and may receive signals representative of the events to which the detector/sensor is responsive. When neuron 35 detects an event of interest it transmits protocol command and control information over the twisted pair loop which is propagated to both GWR 12 and GWL 14, wherein the protocol is transformed and the information is transferred to processor 10. Under normal operating conditions the protocol command/control of the communications loop is maintained by the respective neurons in each of the nodes, wherein the neurons place command/control information on the twisted pair loop at times determined by the respective neurons. Processor 10 does not normally initiate any of this command/control information, although it does periodically provide a coded transmission which is propagated around the loop. In the preferred embodiment this coded transmission is a day/time message, and under normal operating conditions each of the nodes will receive the day/time message at regular intervals, typically 100 milliseconds (ms), and the neuron within each node utilizes this information as an indication that the communications loop is operating properly. A schematic representation of normal operation is shown in FIG. 2A, which illustrates that the neuron 35 associated with node 30 is electrically connected across the twisted pair lines 16, 18.

The preferred embodiment of this invention utilizes software, protocol and hardware manufactured by Echelon Corporation of Palo Alto, Calif. For example, the particular communications protocol which is used by GWR 12 and GWL 14 and the node circuits connected along the communications loop is known as "Lontalk" protocol. This protocol is described in literature provided by Echelon Corporation and will not be further described herein, it being understood that persons having skill in this art will readily understand the protocol and its implementation. The function of GWR 12 and GWL 14 is to translate the normal protocol of processor 10 into the equivalent "Lontalk" protocol for transmission over the communications loop, and to translate received communications from the communications loop into a protocol suitable for processing within processor 10. The implementation and use of different protocols and translations thereof is well known to those having skill in the art. The "neuron" circuits utilized in the preferred embodiment, such as neuron 35, are likewise manufactured by Echelon Corporation. For example, the preferred embodiment utilizes a twisted pair control module Type TP/XF-78, manufactured by Echelon, and alternative embodiments could equally well utilize Type TP-RS485 and Type TP/XF-1250, also manufactured by Echelon Corporation. These twisted pair control modules incorporate integrated circuits such as the Echelon Neuron 3150 Chip and/or the Neuron 3120 Chip, all of which are described in publications of Echelon Corporation. The detailed descriptions of the twisted pair control modules comprising neuron 35, and the other similar neuron circuits in the communications loop, are not further provided herein, it being understood that persons having skill in the art can readily refer to the manufacturer's publications for the use and implementation of such hardware circuits. It is understood that the name "Neuron," "LonTalk," and "Echelon" are trademarks of the Echelon Corporation.

Figure 3A:
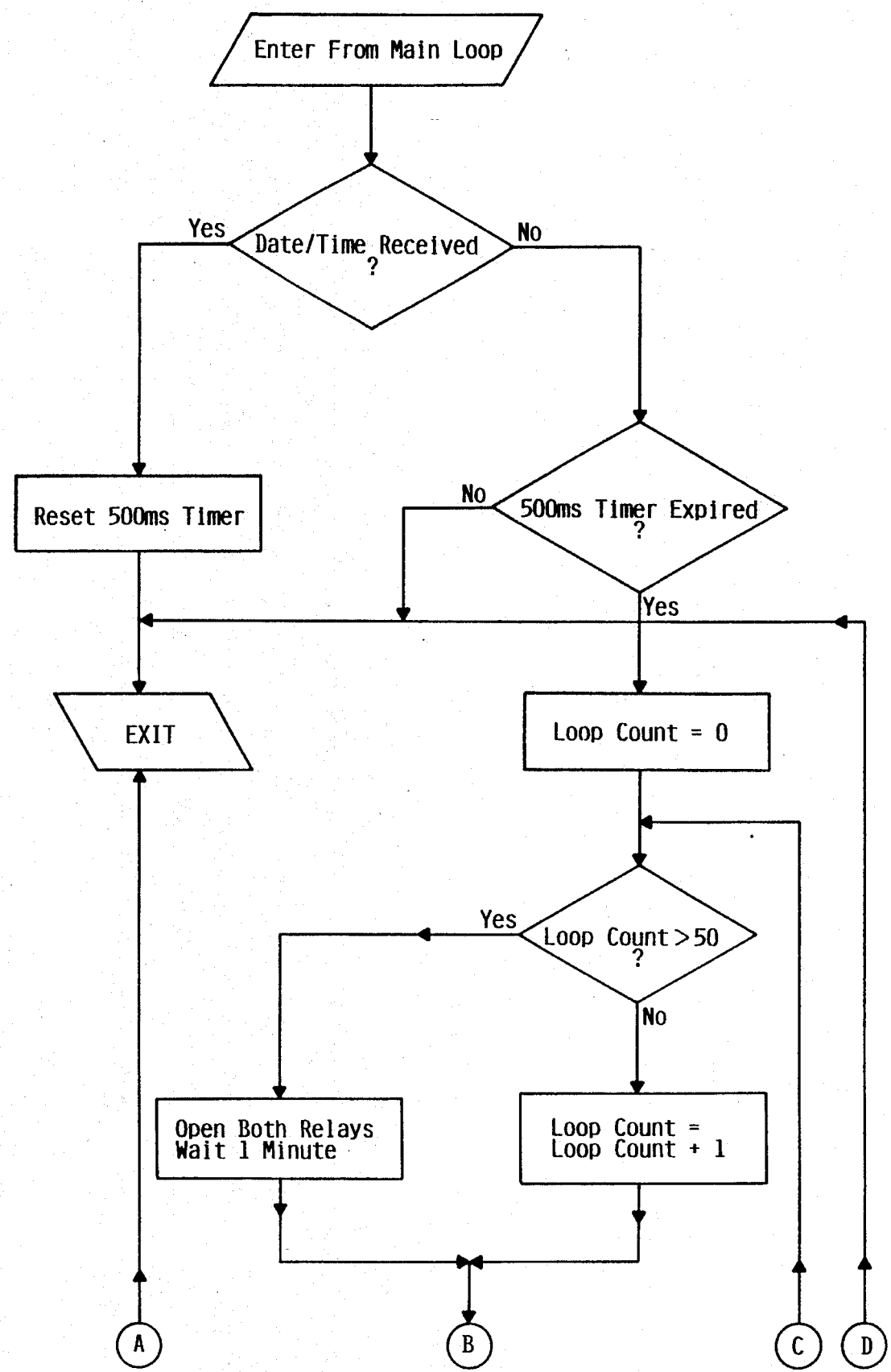
FIGS. 3A–3B show a flow chart of the operational sequence executed during a detected fault condition.
Figure 3B:
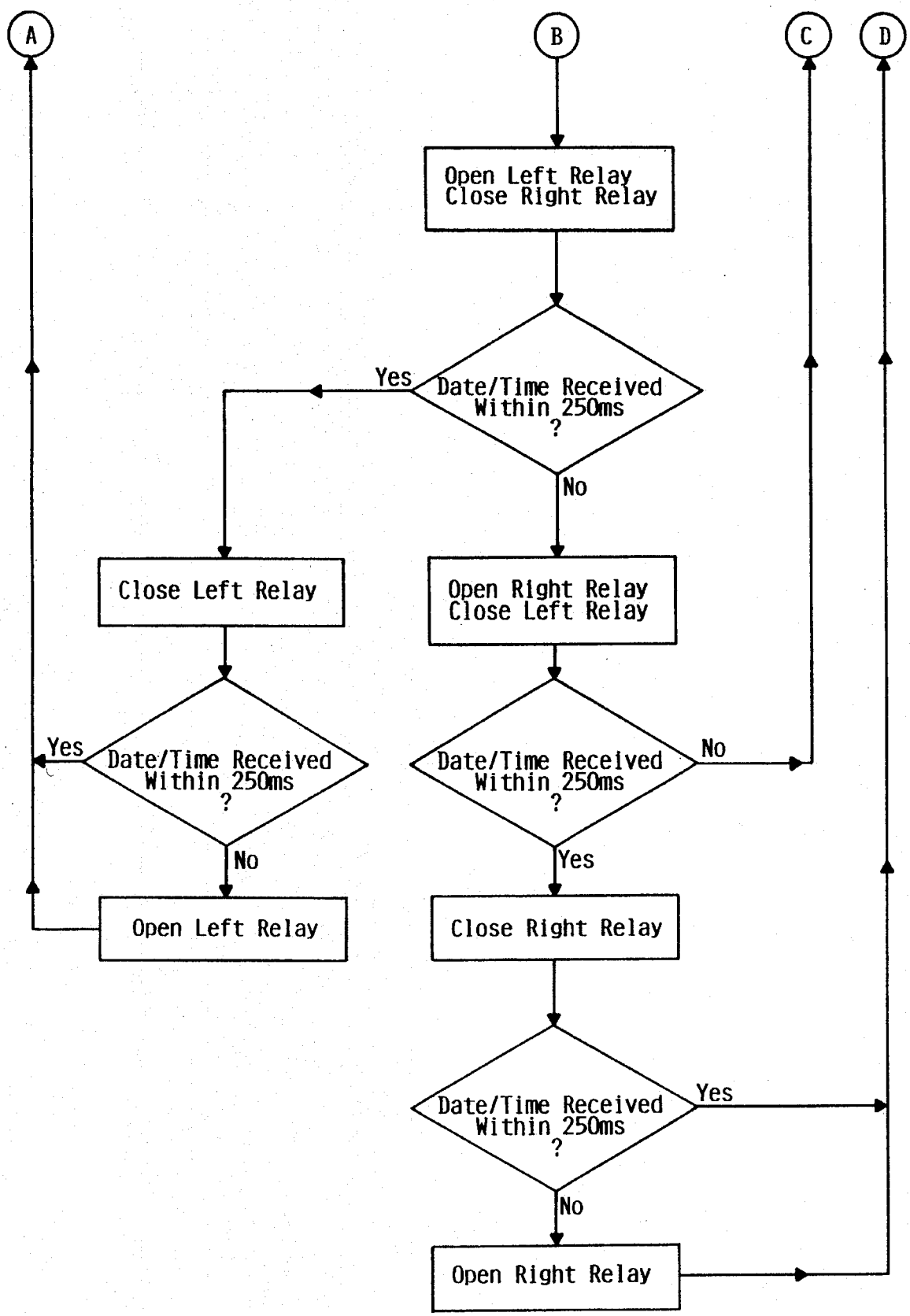

Each neuron includes a computer processor which executes a fault detection algorithm as a part of its normal operating functions. This algorithm is shown in FIG. 3 in flow chart form. After starting the algorithm the neuron first determines whether a date/time message has been received within the preceding 500 ms. If a date/time message has been received the processor immediately exits the algorithm and returns to its other normal operating functions. This is a condition indicating normal operation without faults. Processors within each of the neurons in the respective nodes around the twisted pair loop independently execute this algorithm, and therefore independently verify that the communications path around the twisted pair loop is operating normally. Processor 10 transmits this date/time message alternately via GWR 12 and GWL 14 every 100 milliseconds, and the date/time message returns to processor 10 via GWL 14 and GWR 12 at similar intervals, thereby providing processor 10 with an indication that the communications loop is functioning normally. When processor 10 fails to receive a date/time message from GWR 12 or GWL 14 it assumes that a fault condition has occurred.

Upon occurrence of a fault condition at some unknown point in the communications loop, the fault location is identified according to the technique described hereinafter. Each neuron, executing its respective fault detection algorithm, will continue to receive the date/time message within the 500 ms time interval so long as the fault condition is not a short circuit condition. Therefore, each of the nodes will continue to operate properly when the fault condition results from an open circuit. However, if an open circuit fault condition occurs GWR 12 will continue to receive node signals from the nodes on its side of the open circuit, and GWL 14 will continue to receive node signals from nodes on its side of the open circuit. GWR will no longer receive the date/time message sent by GWL 14, and GWL 14 will no longer receive the date/time message sent from GWR 12. This failure in receiving date/time messages can be recognized by processor 10 as an indication that an open circuit condition has occurred, and an appropriate fault warning or maintenance message may be constructed by processor 10 for display to a maintenance supervisor. However, the node circuits around the communications loop will continue to operate normally.

The occurrence of a short circuit fault condition creates a markedly different operating circumstance, for then none of the node circuits around the communications loop will be able to communicate with either GWR 12 or GWL 14; nor will the date/time messages sent by GWR 12 and/or GWL 14 be received by the other circuit, and the processor will become immediately aware that a short circuit fault condition has occurred. Referring to FIG. 3, the fault detection algorithm will be executed by all neurons within all node circuits around the communications loop. Each neuron will initially determine that no date/time signal has been received within the previous 500 ms, and each neuron within the respective nodes will execute the further steps of the fault detection algorithm in order to isolate and identify the location of the actual short circuit condition.

The first further step will cause the neuron to set a loop counter to a zero count setting. The next step will be to determine the actual loop count setting, which in the case of the first pass through will be not greater than the count of 50. Therefore, the algorithm will update the loop count value by 1 and then open the left relay (LR) in its node, and close the right relay (RR) in its node. The relay contacts in FIG. 1 are shown in their normal operating position which is the closed relay position. Therefore, referring to node 30 of FIG. 1, neuron 35 will energize LR and will leave RR in the position shown on the figure. This creates the representative circuit diagram shown in FIG. 2B, wherein the two-wire connection from node 70 becomes terminated in a line termination impedance, and the two-wire connection from node 50 remains connected to the neuron 35, with a line termination impedance bridging the lines.

The algorithm then determines whether the date/time message has been received within 250 ms, which would indicate that the transmission path via the node 50 is functioning normally. If the neuron 35 determines that this condition does exist, it next closes relay LR to determine whether the fault condition has occurred between node 30 and node 40, as for example at location 99 as shown in FIG. 1. Assuming the short circuit condition exists at location 99, the algorithm then determines that the closure of the relay LR results in loss of the date/time signal, because the short circuit condition has once again been placed into its contact with the two-wire communications loop. Neuron 35 therefore continues with the algorithm and opens relay LR once again, and exits from the fault detection algorithm, having made the determination that the short circuit fault condition exists between node 30 and node 40. This effectively leaves the circuits in the operating condition shown in FIG. 2B, wherein node 30 has established that all nodes to its right along twisted pair 16, 18 are operating properly, and the fault is a short circuit condition between node 30 and node 40; i.e., at location 99.

Figure 2B:
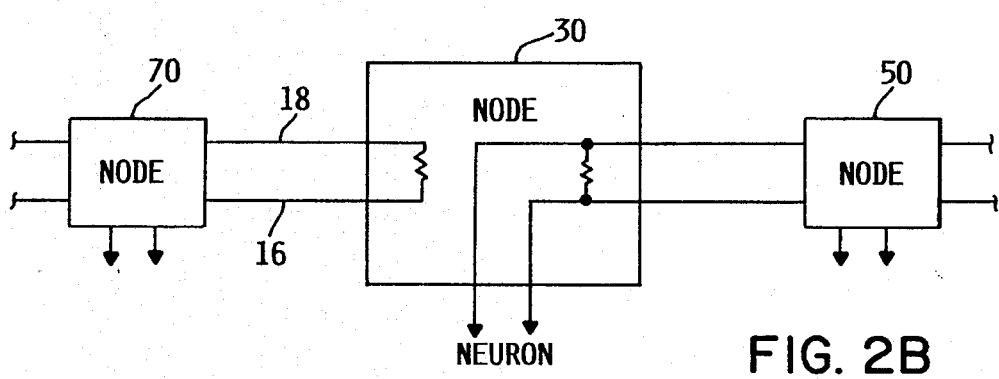

Assuming that the fault condition was a short circuit which occurs at location 98 on FIG. 1 rather than at location 99, the fault detection algorithm executed by neuron 35 in node 30 follows a different path. For example, the neuron first determines that the date/time signal has not been received within 500 ms, and goes through the initialization of its loop counter, and through the step of opening relay LR and closing relay RR. The algorithm then determines that this relay switching operation has produced a date/time signal within 250 ms, and it therefore closes relay LR; however, since the short circuit condition is not in the communications loop between node 30 and node 40, but in fact is farther along the communications loop (at location 98), when neuron 35 closes relay LR it will receive a date/time signal within 250 ms. The reason for this is that node 40 also executes the fault detection algorithm and reaches a point in its execution of the algorithm wherein it determines that its relay LR must be left open in order for its neuron to receive the date/time signal (via node 30). Therefore, node 40 reaches a point in its execution of the fault detection algorithm wherein its relay LR is open and therefore all circuits to the right of node 40, and including node 40 remain able to receive the date/time message from GWR 12. The neuron within node 30 therefore may execute its fault detection algorithm because it determines that it does not need to modify its connection to the communications loop; therefore the node 30 circuit condition is shown in FIG. 2A, whereas the node 40 circuit condition is shown in FIG. 2B.

Figure 2C:
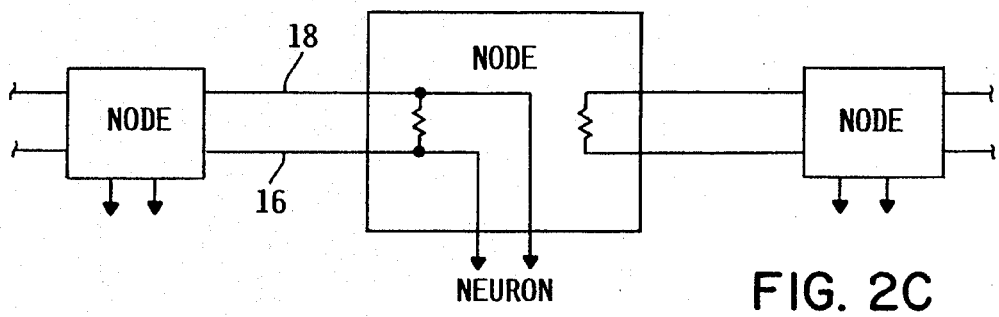

The algorithm performs a similar series of steps when the fault condition is apparently found in the communications loop to the right of node 30. In this situation, node 30 first determines that the date/time message was not received within 500 ms, and after opening relay (LR) and closing relay (RR) it determines that the date/time message still is not received within the allotted 250 milliseconds. The algorithm then causes the right relay (RR) to become opened (energized) and closes the left relay (LR). The algorithm again asks the question whether the date/time message is received within 250 ms, and if it determines that the message has returned it closes the right relay to determine whether the fault is a short circuit condition between node 30 and node 40. It again asks the question whether the date/time message is received within 250 ms, and if it is not received within the allotted time the algorithm once again opens the right relay (RR) and then exits from the program. This leads to the circuit configuration as shown in FIG. 2C. In this circuit configuration, node 30 has determined that a fault exists along the communications loop to its immediate right, between node 30 and node 20.

It should be remembered that each neuron within each node executes the algorithm of FIG. 3 independently of the other neurons. Therefore, each neuron essentially tests the communications loop to its right and to its left, and selectively sets the communications loop path as a result of the tests. Once any neuron has determined that a fault condition exists immediately to one side or the other from its position, it isolates itself from that fault condition side and remains connected to the communications loop on the side which has successfully passed the algorithm test.

Figure 2D:
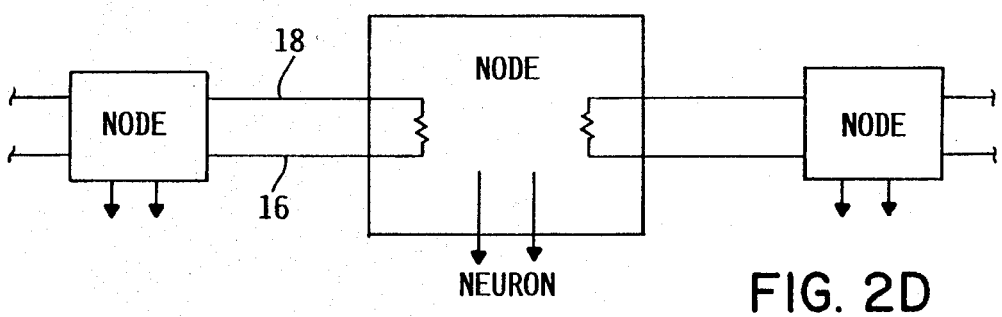

It is also possible that a fault condition could occur in the node itself, rather than to another node connected somewhere along the communications loop. In this circumstance the apparatus has the capability of disconnecting itself from the twisted pair communications loop. Referring to FIG. 3, the node fault detection algorithm first determines that the date/time information has not been received within the preceding 500 ms, and therefore proceeds to reset the loop count to a zero value. The algorithm determines that the loop count is less than a count of 50 and therefore increments the loop count by 1 and proceeds into the portion of the algorithm wherein the left relay (LR) is opened and the right relay (RR) is closed. If the algorithm fails to receive the date/time information within 250 ms it opens the right relay (RR) and closes the left relay (LR) and once again checks for the date/time information. If the information still is not received, the algorithm returns to check the loop count, and to increment the loop count by 1, and to return to the sequence of opening and closing combinations of LR and RR. The algorithm proceeds through this tightly-looped sequence 50 times, and eventually determines that the loop count is greater than the count of 50, whereupon the algorithm opens both relays LR and RR and initiates a one-minute timer. After the conclusion of the one-minute time interval the algorithm returns to the loop of sequentially opening LR and RR to determine whether the condition has been corrected. If the condition has not been corrected the algorithm immediately again returns to the one-minute waiting interval, with both relays open. During this interval the effective circuit diagram is as shown in FIG. 2D. FIG. 2D shows a line termination impedance at each of the node input connections, with the node internal neuron wholly disconnected from the lines. The node will effectively remain in this condition (with brief sequences through the testing loops).

During the time intervals when any of the representative circuits of FIGS. 2B–2D are connected, the twisted pair loop consisting of lines 16, 18 is severed at some point in the communications loop. GWR 12 and GWL 14 each continue transmitting the date/time information every 100 ms, and all of the nodes connected to GWR 12 can still communicate with processor 10 via GWR 12, and will continue to do so indefinitely. Likewise, all of the nodes connected to GWL 14 will continue to communicate with processor 10 through GWL 14. Processor 10 may readily transmit fault condition and maintenance information via its operator interface link to alert the operator that a fault condition has occurred and to provide a message identifying the location of the fault condition. Once the fault condition has been corrected, the fault detection algorithms operating in all of the nodes will automatically readjust the line connection so as to restore the communications loop to normal operating condition. For any short circuit fault condition, the operation of the fault detection algorithm will result in the nodes on both sides of the short circuit condition to open the communications loop and place a line termination resistance across the open end, thereby isolating the section of communications loop wherein the short exists.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for detecting and isolating a fault condition in any of a plurality of node circuits, in a communications loop comprised of a plurality of said node circuits connected along a two-wire closed communications loop, wherein the respective ends of the closed loop are connected to a computer processor, and each node circuit may independently send data to and receive data from the processor via the communications loop, comprising:

a) each node circuit respectively having connections to a neuron circuit associated therewith, and each neuron circuit having means for connection to a data-originating circuit, and means for transferring data from said data-originating circuit to said node circuit;

b) each node circuit respectively having a fault switching circuit interposed between said two-wire communications loop and said neuron circuit, each said fault switching circuit further comprising:

i) a first switching state wherein said communications loop is unbroken and is connected to said neuron circuit associated with said respective node circuit;

ii) a second switching state wherein said communications loop is broken and a first broken end is terminated in a line resistance and a second broken end is connected to said neuron circuit;

iii) a third switching state wherein said communications loop is broken and a first broken end is connected to said neuron circuit and a second broken end is terminated in a line resistance; and iv) a fourth switching state wherein said communications loop is broken and both of said broken ends are each terminated in a line resistance;

c) said computer processor having means for periodically sending coded transmission signals to a first end of said two-wire communications loop, and for receiving said coded transmission signals from the second end of said loop;

d) each of said neuron circuits having means for periodically checking for said coded transmission signals and for actuating said fault switching circuit to one of said plurality of switching states if said coded transmission signals are not received by said neuron circuit, comprising means for switching said fault switching circuit to said first state when said coded transmission signals are detected to be present, and switching said fault switching circuit to said second state when said coded transmission signals are not detected; and e) said computer processor having means for periodically checking for the return of said coded transmission signals and for changing the state of its sending coded transmission signals when the return of coded transmission signals is not detected, whereby said computer processor sends coded transmission signals from both of said ends of said communications loop thereafter.

2. The apparatus of claim 1, wherein said coded transmission signals further comprise signals representative of date and time identifiers.

3. The apparatus of claim 1, wherein said neuron circuits' means for periodically checking and actuating further comprises means for rechecking for said coded transmission signals when said fault switching circuit is in said second state, and for leaving said fault switching circuit in said second state when said rechecked coded transmission signals are detected, and for switching said fault switching circuit to said third state when said rechecked coded transmission signals are not detected.

4. The apparatus of claim 3, wherein said neuron circuits' means for periodically checking and actuating further comprises means for further rechecking for said coded transmission signals when said fault switching circuit is in said third state, and for leaving said fault switching circuit in said third state when said further rechecked coded transmission signals are detected, and for switching said fault switching circuit to said fourth state when said further rechecked coded transmission signals are not detected.

5. The apparatus of claim 4, wherein said neuron circuits' means for periodically checking and actuating further comprises leaving said fault switching circuit in said fourth state for a predetermined time, and means for repeating the apparatus claimed in claims 2–4 a predetermined number of times.

* * * * *